United States Patent [19]
Brekken

[11] 3,871,947
[45] Mar. 18, 1975

[54] BIAXIALLY ORIENTED POLYETHYLENE TEREPHTHALATE FILM HAVING A SURFACE SUITABLE FOR WRITING THEREON

[75] Inventor: Roger A. Brekken, Hastings, Minn.

[73] Assignee: Minnesota Mining and Manufacturing Company, St. Paul, Minn.

[22] Filed: Jan. 15, 1973

[21] Appl. No.: 323,844

[52] U.S. Cl............... 161/116, 161/164, 161/166, 161/167, 161/231, 264/171, 264/210 R, 117/10, 117/122 P, 117/138.8 F, 156/244
[51] Int. Cl........................ B32b 3/00, B32b 33/00
[58] Field of Search ...... 161/116, DIG. 3, 402, 413, 161/164, 165, 166, 167, 231, 406; 117/10, 138.8 F, 122 P; 156/209, 219, 220, 229, 244; 264/162, 289, 171, 210 R

[56] References Cited
UNITED STATES PATENTS

| | | | |
|---|---|---|---|
| 2,951,305 | 9/1960 | Seymour | 264/162 |
| 3,370,951 | 2/1968 | Hasenauer | 117/138.8 F |
| 3,515,626 | 6/1970 | Duffield | 161/231 |
| 3,627,625 | 12/1971 | Varrett | 161/231 |
| 3,705,835 | 12/1972 | Barrian | 161/90 |
| 3,737,354 | 6/1973 | Hattori | 156/229 |
| 3,767,523 | 10/1973 | Schwarz | 161/164 |

FOREIGN PATENTS OR APPLICATIONS 766,728   9/1967   Canada............................. 161/402

Primary Examiner—George F. Lesmes
Assistant Examiner—Stanley S. Silverman
Attorney, Agent, or Firm—Alexander, Sell, Steldt and Delahunt

[57] ABSTRACT

An integral heat-set, biaxially oriented composite film comprised of a layer of transparent polyethylene terephthalate having a smooth exposed major surface and a transparent copolyester layer having a matte exposed major surface. The film is dimensionally stable, strong, tough and water resistant, receptive to writing, and transparent when applied to a substrate, permitting visual recognition of indicia therethrough. The film provides a particularly superior backing for an adhesive tape.

9 Claims, 3 Drawing Figures

BIAXIALLY ORIENTED POLYETHYLENE TEREPHTHALATE FILM HAVING A SURFACE SUITABLE FOR WRITING THEREON

BACKGROUND OF THE INVENTION

This invention relates to biaxially oriented polyethylene terephthalate film having a surface suited for writing and drawing thereon, and to a method of making such a film. The invention also relates to pressure-sensitive adhesive tape constructions made with such a film.

Transparent pressure-sensitive adhesive tape is a common household item and is widely used in commerce and industry. Early tapes employed cellophane as a backing because of its excellent clarity, dispensability and smoothness as well as adequate strength for many holding and packaging applications. Cellophane, however, is subject to the disadvantage of becoming brittle or yellow on prolonged aging, particularly when exposed to sunlight or to low humidity.

Cellulose acetate films have now achieved great commercial success in such uses as packaging and mending books and in other applications because they avoid the disadvantages associated with cellophane mentioned above and because they have many other advantages. For example, films of cellulose acetate are readily provided with a matte finish surface which is capable of being written upon by conventional writing instruments such as pens and pencils. Of even greater significance is the transparency of matte finish cellulose acetate films when they have been applied upon a substrate. These films not only permit complete visual recognition of indicia on the substrate, but they are also virtually invisible when so applied. An extremely popular and commercially successful example of a tape utilizing such a matte-surfaced cellulose acetate film is sold under the trade designation "Magic Mending Tape".

While matte-surfaced cellulose acetate films are quite satisfactory as tape backings for many packaging, book mending and other purposes, there is a need for a film tape backing which has higher tear-resistance, dimensional stability, chemical resistance, water resistance, abrasion resistance and temperature stability. Biaxially oriented polyethylene terephthalate film meets these specifications, providing higher physical properties in each of the categories enumerated above. Paradoxically, however, it is these very properties which have precluded its use as a matte-surfaced tape backing. Heat-set biaxially oriented polyethylene terephthalate film, made by any one of a number of known processes, has a smooth, tough, abrasion resistant, chemical resistant, dense surface which can not be marked by conventional writing instruments and which renders the tape readily visible when applied to a substrate.

Numerous unsuccessful attemps have been made to render the surface of the heat-set biaxially oriented polyethylene terephthalate writable. While many of these attempts have some merit, producing products which may be suitable for some applications, none has produced a completely satisfactory product for use as a transparent tape backing capable of being written upon.

Johnson (U.S. Pat. No. 3,154,461), Karickhoff (U.S. Pat. No. 3,382,206) and Benning (U.S. Pat. No. 3,361,704) load plastic film-forming materials with fillers to provide a matte-surface which is semi-opaque, precluding its use as a transparent sheet material. Similarly, Herrmann et al (U.S. Pat. No. 3,100,722), Hasenauer et al (U.S. Pat. No. 3,370,951) and Duffield (U.S. Pat. No. 3,515,626) laminate a filled layer upon a polyethylene terephthalate layer to provide a write-on surfaced composite film which is also semi-opaque. Seymour (U.S. Pat. No. 2,951,305) and Graboves (U.S. Pat. No. 3,271,229) abrade the normally lustrous surface of biaxially oriented polyethylene terephthalate film, producing a matte finish; however, not only do the numerous lacerations caused thereby weaken the film, but it is also difficult to control the abrasion and an undesirable nonuniform product having a linear anisotropic surface pattern can result. German Pat. No. 1,729,080 discloses embossing a molten polyethylene terephthalate film prior to solidifying; however, biaxial orientation of the solidified film would remove any embossed pattern.

Attempts have been made to emboss the surface of biaxially oriented heat-set polyethylene terephthalate film with a heated matte-surfaced embossing roll to provide the film with a writable matte finish. Once biaxially oriented and heat-set, however, the film structure becomes highly crystalline with a very sharp melting point, and heating such a highly crystalline material results in a rapid melting without softening, precluding rendering its surface writable by embossing. Even if it were possible to emboss the heat-set biaxially oriented film in this manner, the heating required would remove the orientation, leaving a weaker, less desirable film.

Other attempts have been made to roughen the surface of heat-set biaxially oriented polyethylene terephthalate by surface etching with chemical agents such as acids, bases or solvents which chemically attack or dissolve a portion of the surface to roughen it. An example of this type of treatment may be seen in U.S. Pat. No. 3,607,354. Chemical treatments are generally insufficient to create enough roughness in the surface so that it can be marked by writing instruments. The chemical treatment can be made more aggressive to produce a surface which is sufficiently roughened, but the film is structurally weakened by such treatment.

SUMMARY OF THE INVENTION

The present invention provides a matte-surfaced composite film which has unique and valuable advantages. The film is an integral heat-set, biaxially oriented composite of a layer of transparent polyethylene terephthalate having a smooth exposed major surface and a transparent copolyester layer having a matte exposed major surface. The unique composite film is dimensionally stable, strong, tough and water resistant and suitable for writing thereon with conventional writing instruments such as pencils, pens, etc. Additionally, although the film is merely translucent when it is interposed between a lighted background and a viewer, it is transparent (and virtually invisible) when applied to a substrate, permitting complete visual recognition of indicia therethrough.

The composite film in accordance with the present invention comprises a flexible self-supporting polyethylene terephthalate layer and a flexible tack-free copolyester layer. The polyethylene terephthalate is transparent and should be of a very high molecular weight, preferably 10,000 or higher. The polyethylene terephthalate may be formed from the reaction of approximately equal moles of ethylene glycol and terephthalic acid, the reaction being well known in the art.

The copolyester which comprises the copolyester layer has a broad softening temperature range, preferably spanning at least 20 Centigrade °. At least part of this softening range is lower than the melting temperature of the polyethylene terephthalate comprising the polyethylene terephthalate layer; preferably, the entire range is lower than the melting point of polyethylene terephthalate. When applied as a layer to the surface of the polyethylene terephthalate layer, the copolyester is capable of forming an adherent bond therewith, which bond tenaciously resists separation under the orientation, heat-setting, surface treatment and use conditions, as will hereinafter be described. The preferred copolyester for meeting the requirements set forth above contains more than 50 mole percent and less than 90 mole percent ethylene terephthalate and correspondingly less than 50 mole percent to more than about 10 mole percent isophthalate or ethylene hexahydrophthalate. Typical copolyesters of this type have an inherent viscosity of about 0.5 to 0.7 dl/gm when determined at a concentration of 0.5 gm/100 ml trifluoroacetic acid at a temperature of 30°C.

A composite film of a polyethylene terephthalate layer and a copolyester layer may be formed by any one of several techniques. A molten layer of the copolyester may be extruded from a molten batch and deposited upon the surface of a solid polyethylene terephthalate layer. Alternatively, a solid polyethylene terephthalate layer may be coated with a solution of the copolyester in a solvent.

The preferred composite film for use in the invention is formed by a coextrusion process, wherein both layers are brought into contact while they are still in a molten state. Generally, with coextrusion, formation and adhering of the layers takes place inside the extruder die, and the film is expelled from the die as an integral multi-layer structure. Alternatively, the layers may be extruded from a multi-orifice die and caused to merge immediately thereafter, while still molten, to form the integral multi-layered structure. Coextruded composite films prepared in this manner look much like monofilms.

Coextrusion of composite films can be accomplished by two known techniques, viz, the "blown" and "cast" methods. In the blown method, described in U.S. Pat. No. 3,486,196, a film is extruded as a continuous tube from a tube-forming annular die arrangement. The tube may be filled with air as it is being extruded to stretch the tube wall to the desired thickness. In the cast coextrusion method, described in U.S. Pat. No. 3,476,627, a flat composite film is extruded from a slot die as a continuous sheet.

The composite film, formed as described above, is amorphous and glossy-surfaced. It is thereafter endowed with improved physical properties by biaxial orientation and heat-setting. Biaxial orientation involves stretching the film in two directions normal to each other, generally in the machine direction and at right angles thereto. In a typical operation, the freshly formed molten composite film is fed onto a cooling drum to produce a quenched amorphous film which is briefly heated and stretched in the machine direction, and then conducted through a tenter frame where it is stretched transversely with moderate heating. Machine direction stretching may be accomplished by passing between two sets of nip rolls the second set rotating at a higher speed than the first. Stretching typically increases the film area by a factor of at least six, the stretching usually being equal in each direction. For applications requiring a higher tensile film, this factor will be larger, e.g., above 14, and the stretching may be greater in one direction than the other.

Heat-setting, or heat stabilization, of the stretched composite film is accomplished by restraining the film at its stretched dimension and heating briefly, then quenching. Such heating is typically in the range of 175°C. – 240°C.

The glossy-surfaced, biaxially oriented, heat-set composite film described above is provided with a matte finish by passing it between squeeze rolls in which a matte-surface roll contacts the copolyester layer surface and a smooth pressure roll contacts the polyethylene terephthalate surface. The matte-surfaced roll and/or the pressure roll are heated to a temperature within the softening temperature range of the copolyester, and as the copolyester layer is held in contact with the matte-surfaced roll it softens and takes on the matte surface of the roll. For the preferred copolyesters mentioned above, typical softening temperatures will be in the range from about 130°C. to 220°C. with nip pressures varying between 30 and 90 psig.

The glossy-surfaced composite film should have a polyethylene terephthalate layer thickness of at least 0.1 mil to obtain the benefit of the higher physical properties of this material. The copolyester layer should have a thickness of at least 0.2 mil for it to be adequately provided with a matte surface. Substantially no change in thickness is encountered after the matte surface is produced. The thickness of biaxially oriented heat-set matte-surfaced film is thus generally at least 0.3 mil with the maximum thicknesses being any commercially feasible value. When used as a backing for a pressure-sensitive adhesive tape, the matte-surfaced biaxially oriented heat-set composite film of the invention may vary from about 0.3 to 3.0 mils in thickness, and is preferably about 0.5 to 2.0 mils in thickness.

A pressure-sensitive adhesive tape is prepared from the matte-surfaced composite of the invention by coating a suitable adhesive on the exposed polyethylene terephthalate surface. It may be necessary to prime or etch this surface to provide a suitable bond between the adhesive and the surface for some adhesives. This bond should preferentially resist separation over a bond between the adhesive and a substrate to which it is applied to prevent off-setting or splitting of the adhesion. Surface treatments are well known for this purpose; see, for example, aforementioned U.S. Pat. No. 3,607,354.

The pressure-sensitive adhesive used to coat the polyethylene terephthalate surface may be any one of a number of known tacky adhesive compositions including, for example, the acrylate adhesives disclosed in U.S. Pat. No. Re. 24,906. Other tacky adhesive compositions are also well known for this purpose.

It should be noted that while the most commercially interesting use for the film of the invention at the present is for a backing for pressure-sensitive adhesive tape, there are a variety of other uses which are possible. Rather than providing the surface of the polyester layer with a matte finish, this surface can be provided with any of a wide variety of surface patterns by use of a suitable contact roll. The polyester surface may be imprinted with a decorative pattern of almost any nature, such as wood grain, fabric weave, floral or other decorative designs. As such, the film may be used to cover books, furniture, and various other articles, and as a wall covering. Additionally, a polyester surface may be imprinted with indicia which would reveal trade information or the retail price of an item of commerce to be wrapped therein. The matte-surfaced film, as well as being useful for a tape backing, can be used for a protective, non-reflective covering on photographs, prints, and similar articles which may be framed or otherwise mounted for viewing. Additionally, the matte-surfaced film can be used as a medium for writing, for example, as tracing or drafting paper.

BRIEF DESCRIPTION OF DRAWING

Understanding of the invention will be facilitated by referring to the accompanying drawing, in which.

DESCRIPTION OF PREFERRED EMBODIMENTS

Figure 1:
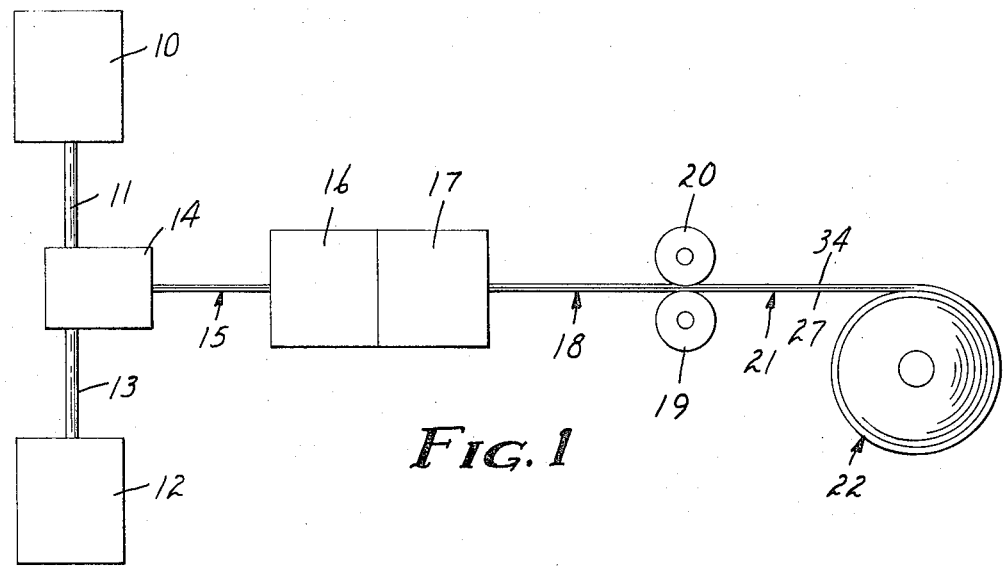
FIG. 1 is a schematic drawing indicating the apparatus for and the method of making a composite film according to the invention.

In the apparatus illustrated schematically in FIG. 1, polyethylene terephthalate is heated to a molten state in extruder 10, the molten polymer forced therefrom through conduit 11 into coextrusion die 14, while copolyester is simultaneously melted in extruder 12 and likewise forced into the die through conduit 13. This simultaneous polymer flow is formed by die 14 into an integral composite film 15 consisting of a layer of polyethylene terephthalate and a layer of copolyester.

Figure 2:
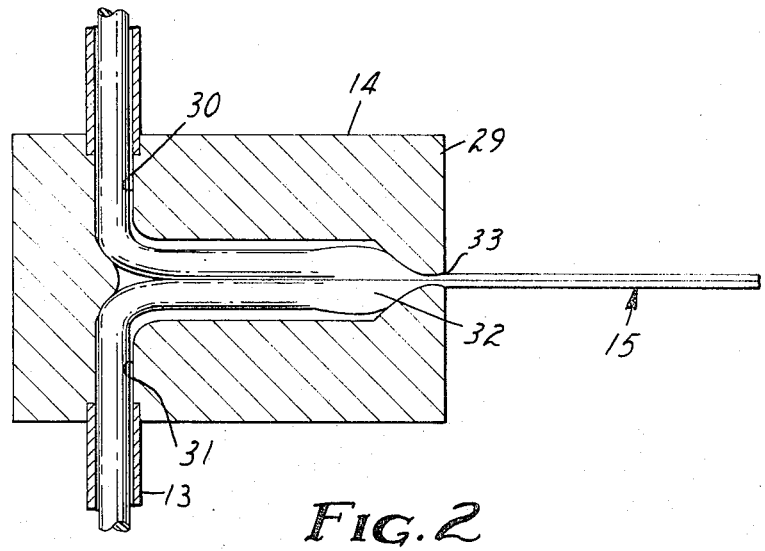
FIG. 2 is a cross sectional view in detail of a portion of the apparatus shown in the schematic drawing of FIG. 1.

Coextrusion die 14, shown in greater detail in FIG. 2, comprises passageways 30 and 31 which are in communcation with conduits 11 and 13 respectively, which passageways merge into a single chamber 32. Molten polymers which are forced through conduits 11 and 13 into passageways 30 and 31, respectively, merge in chamber 32, are expelled through a slot-like opening 33 as an integral sheet onto a casting wheel (not shown). Prior to being expelled, the two merging streams of molten polymer are sheeted into molten films which are brought into contact with one another to form an integral composite film 15.

The freshly extruded film is then transported from the casting wheel to a stretching device 16 wherein it is biaxially oriented, and, while still under restraint, the film is transported to heat-setting station 17 wherein it is briefly heated at a heat-setting temperature. The resultant composite film 18 is then either rolled and stored for subsequent surface treatment or it is fed through a nip roll arrangement comprised of matte-surfaced roll 20 and pressure roll 19, at least one roll being heated to soften the copolyester so that it is capable of conforming to the matte surface of the roll at the particular roll pressure used. The resultant composite film 21, having a matte surface 34, may be stored as roll 22.

Figure 3:
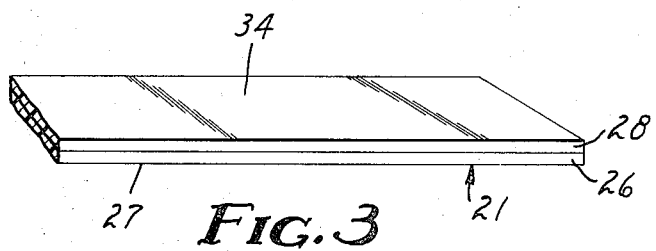
FIG. 3 is a perspective sectional view of a film made in accordance with the present invention.

The biaxially oriented heat-set composite film 21, as shown in FIG. 3, consists of polyethylene terephthalate layer 26 having a glossy surface 27 and copolyester layer 28 having a matte surface 34.

The invention is further illustrated by reference to the following examples.

Example 1

Granular polyethylene terephthalate resin having a solution intrinsic viscosity of 0.62 was extruded at a barrel temperature of 230°C., a die temperature of 300°C. and a feed rate of 100 lbs. per hour, utilizing coextrusion apparatus of the type described above. Simultaneously, a granular copolyester resin having an intrinsic viscosity of 0.62 and consisting of 80 mole percent ethylene terephthalate and 20 mole percent ethylene isophthalate was extruded at a barrel temperature of 200°C. and a feed rate of 50 lbs. per hour. The resultant molten composite film was cast onto a 12 inch diameter casting wheel maintained at 60°C. and rotated at 8 feet per minute, producing a quenched film 15 mils in thickness having a 10 mil thick polyethylene terephthalate layer and a 5 mil thick copolyester layer. The quenched film was then oriented in the machine direction by stretching between a series of idler nip rolls having outlet nip rolls operated at three times the speed of inlet nip rolls while heating the film at 80°C. The uniaxially oriented composite film was then fed into a tenter oven heated at 95°C. wherein it was stretched 2.75 times in the transverse direction. The biaxially oriented composite film was heat-set by briefly heating under restraint at 205°C. The resultant glossy-surfaced composite film had a 1 mil thick polyethylene terephthalate layer and a 0.5 mil thick copolyester layer.

EXAMPLE 2

The composite film prepared as described in Example 1 was given a matte-surface by passing it between a nip roll arrangement consisting of a 6 inch diameter rubber pressure roll and a 6 inch diameter matte-surfaced steel embossing roll heated at 140°C. at a speed which provided a contact residence time of 3.6 seconds. The matte-surfaced embossing roll had been prepared by sand-blasting the surface of a steel cylinder with Grade 100 silicon carbide particles, making three passes with a 6-inch nozzle-to-piece distance and an air pressure of 80 psig through a ⅜ inch nozzle.

The resultant matte-surfaced film was tested on a Gardner gloss meter at 60° according to ASTM test method D-523 and found to have a gloss rating of 16.5. By comparison, the polyethylene terephthalate surface had gloss ratings of 85–100.

The physical properties of the matte-surfaced film described above were compared with those of matte-surfaced cellulose acetate film which is commercially available under the trade designation "No. 810" matte acetate tape by the 3M Co.

| Physical property | ASTM Test No. | Matte Composite | Acetate Film |
|---|---|---|---|
| Thickness | D-374 | 1.4 mil | 1.7 mil |
| Yield strength | D-882 | 16 mpsi | 8 mpsi |
| Break strength | D-882 | 29 mpsi | 9.4 mpsi |
| Break elongation | D-882 | 110% | 65% |

The matte-surfaced composite had excellent write-on properties with both pen and pencil.

EXAMPLE 3

The composite film of Example 1 was embossed with a flat steel die having surface corrugations resembling the surface of a file by pressing the copolyester surface of the film with the die against a flat surface heated at 170°C. with a force of 40 lbs. per sq. in. for 1.75 seconds. The copolyester surface was embossed with surface corrugations providing a unique, decorative, tough, flexible film.

EXAMPLES 4 AND 5

The composite films identified as Example 4 and 5 below and consisting of a polyethylene terephthalate layer and a copolyester layer (80 mole percent terephthalate and 20 mole percent isophthalate) were prepared as described in Example 1 and embossed with a fabric pattern roll using a three roll 2 nip roll arrangement consisting of a 2.5 inch diameter pressure roll, 7.5 inch diameter heated (150°–170°C.) pressure roll and a 2.5 inch diameter glass fabric covered stell embossing roll (at room temperature). The smaller pressure roll and the embossing roll were arranged at opposite sides of the larger pressure roll, providing 2 nips, the nip pressure between the embossing roll and the larger pressure roll being set forth below.

The composite films were passed through the nip formed between the pressure rolls around and in contact with approximately half the surface of the large pressure roll such that the polyethylene terephthalate layer contacted this surface, and then through the nip formed between the large roll and the embossing roll such that the copolyester layer contacted the embossing roll. This roll arrangement permitted the film to be preheated before it was passed through the embossing nip, allowing embossing at lower temperatures. The resultant embossed film had a unique fabric finish.

The composite films, preheat times, and nip pressures are set forth below

|  | Example 4 | 5 |
|---|---|---|
| Polyethylene terephthalate layer thickness, mils | 1.0 | 0.40 |
| Copolyester layer thickness, mils | 0.5 | 0.35 |
| Preheat time, seconds | 8 | 6.5 |
| Nip pressure, psig | 60 | 25 |

EXAMPLES 6–8

The films described below were embossed with a hexagonal pattern by utilizing a 16 inch diameter heated (135°C.) embossing roll having a male hexagonal pattern projecting 1/32 inch therefrom and comprised of ⅛-inch hexagonal cells. Embossing was accomplished utilizing a 5-inch diameter rubber pressure roll in a nip arrangement with the embossing roll at a nip pressure of 38 psig at a film speed of 4 feet per minute.

The embossed composite films had a decorative hexagonal pattern.

| Example No. | Polyethylene terephthalate layer thickness (mils) | Copolyester layer thickness (mils) |
|---|---|---|
| 6 | 1.0 | 1.5 |
| 7 | 1.0 | 0.5 |
| 8 | 0.4 | 0.35 |

EXAMPLE 10

A flat zinc plate having a photographically engraved walnut wood grained pattern on one surface and held in a flat press heated at 190°C. was used to emboss a wood grain pattern into the film described above as Example 6 by pressing the film for 15 seconds at 80 psig. The resultant film had a unique wood grain finish.

What is claimed is:

1. An integral heat-set, biaxially oriented composite film comprised of a layer of transparent polyethylene terephthalate having a smooth exposed major surface and an internally transparent copolyester layer having a matte exposed major surface, the copolyester layer having a softening temperature range at least part of which is lower than the melting temperature of said polyethylene terephthalate layer wherein the copolyester layer contains from more than 50 mole percent to less than 90 mole percent ethylene terephthalate and correspondingly from less than 50 mole percent to more than 10 mole percent ethylene isophthalate or ethylene hexahydrophthalate.

2. The composite film of claim 1 wherein said polyethylene terephthalate layer has a thickness of at least 0.1 mil.

3. The composite film of claim 1 wherein said copolyester layer has a thickness of at least 0.2 mil.

4. An integral heat-set, biaxially oriented composite film comprised of a layer of transparent polyethylene terephthalate layer having a smooth exposed major surface and a transparent copolyester layer having an embossed major surface, the copolyester having a softening temperature less than that of said polyethylene terephthalate layer wherein the copolyester layer contains from more than 50 mole percent to less than 90 mole percent ethylene terephthalate and correspondingly from less than 50 mole percent to more than 10 mole percent ethylene isophthalate or ethylene hexahydrophthalate.

5. An article having an exposed surface covered by the composite film of claim 4.

6. A pressure-sensitive adhesive tape which is dimensionally stable, strong, tough, water-resistant, has a surface suitable for writing thereon and is transparent when applied to a substrate, comprising, in combination, an integral heat-set biaxially oriented composite film comprised of a layer of transparent polyethylene terephthalate having a smooth exposed major surface and a transparent copolyester layer having a matte exposed major surface and a layer of tacky pressure-sensitive adhesive uniformly covering said smooth exposed major surface wherein the copolyester layer contains from more than 50 mole percent to less than 90 mole percent ethylene terephthalate and correspondingly from less than 50 mole percent to more than 10 mole percent ethylene isophthalate or ethylene hexahydrophthalate.

7. The adhesive tape of claim 6 wherein said pressure sensitive adhesive is an acrylate adhesive.

8. The film of claim 1 wherein said layers are coextruded.

9. The film of claim 4 wherein said layers are coextruded.

* * * * *